US012646222B2

(12) United States Patent
Quach et al.

(10) Patent No.: US 12,646,222 B2
(45) Date of Patent: Jun. 2, 2026

(54) STATE SUMMARIZATION FOR BINARY VOXEL GRID CODING

(71) Applicant: InterDigital Patent Holdings, Inc., Wilmington, DE (US)

(72) Inventors: Maurice Quach, Gif-sur-Yvette (FR); Jiahao Pang, New York, NY (US); Muhammad Asad Lodhi, New York, NY (US); Dong Tian, New York, NY (US); Giuseppe Valenzise, Gif-sur-Yvette (FR); Frederic Dufaux, Gif-sur-Yvette (FR)

(73) Assignee: InterDigital Patent Holdings, Inc., Wilmington, DE (US)

(*) Notice: Subject to any disclaimer, the term of this patent is extended or adjusted under 35 U.S.C. 154(b) by 247 days.

(21) Appl. No.: 18/706,208

(22) PCT Filed: Oct. 18, 2022

(86) PCT No.: PCT/US2022/046957
§ 371 (c)(1),
(2) Date: Apr. 30, 2024

(87) PCT Pub. No.: WO2023/081009
PCT Pub. Date: May 11, 2023

(65) Prior Publication Data
US 2025/0014228 A1        Jan. 9, 2025

Related U.S. Application Data

(60) Provisional application No. 63/332,375, filed on Apr. 19, 2022, provisional application No. 63/275,511, filed on Nov. 4, 2021.

(51) Int. Cl.
*G06K 9/00*        (2022.01)
*G06T 9/00*        (2006.01)

(52) U.S. Cl.
CPC .............. *G06T 9/001* (2013.01); *G06T 9/002* (2013.01)

(58) Field of Classification Search
CPC ......... G06T 9/001; G06T 9/002; G06T 9/005; G06T 9/40; H04N 19/91
See application file for complete search history.

(56) References Cited

U.S. PATENT DOCUMENTS

2021/0192797 A1*   6/2021   Lasserre ................. G06T 9/001
2021/0383575 A1*   12/2021   Zhang ....................... G06T 9/40
(Continued)

FOREIGN PATENT DOCUMENTS

EP              3553745 A1      10/2019
WO       WO2022150680 A1       7/2022
WO       WO2023059727 A1       4/2023

OTHER PUBLICATIONS

Lasserre, Sébastien, David Flynn, and Shouxing Qu. "Using neighbouring nodes for the compression of octrees representing the geometry of point clouds." Proceedings of the 10th ACM Multimedia Systems Conference. 2019. (Year: 2019).*
(Continued)

*Primary Examiner* — Avinash Yentrapati
(74) *Attorney, Agent, or Firm* — Xiaoan Lu

(57) ABSTRACT

In one implementation, we improve the binary voxel-based octree coding method, via a proposed state summarization module for context modeling. Given a current voxel to be encoded or decoded, instead of directly estimating its occupancy probability based on the associated binary occupancy context, a proposed state summarization module is applied to convert the original binary context to a summarized representation. Under the summarized representation, the estimation of the occupancy probability becomes more affordable and effective. In particular, density-based state (Continued)

summarization, pattern-based, learning-based state summarization, and learning-based state summarization methods are provided.

20 Claims, 17 Drawing Sheets

(56)                    References Cited

U.S. PATENT DOCUMENTS

| | | | | |
|---|---|---|---|---|
| 2023/0162402 A1* | 5/2023 | Zhang | ..................... | G06T 9/001 |
| | | | | 382/232 |
| 2024/0078715 A1* | 3/2024 | Lodhi | ....................... | G06T 9/40 |
| 2024/0406427 A1* | 12/2024 | Lodhi | .................... | H04N 19/91 |

OTHER PUBLICATIONS

"G-PCC codec description v12", WG 7, MPEG 3D Graphics Coding, ISO/IEC JTC 1/SC 29/WG 7, N0151, Sep. 24, 2021.

Lodhi et al., "Point Cloud Geometry Compression Using Learned Octree Entropy Coding", ISO/IEC JTC 1/SC 29/WG 7 m58167, Oct. 2021.

Lasserre et al., "On Improving The Coding of Neighbour-Based Occupancy of Octree in GCC", m58303 presentation slides, 136, MPEG Meeting, Nov. 10, 2021.

Qi et al., "Pointnet++: Deep Hierarchical Feature Learning on Point Sets in a Metric Space", Cornell University Library, arXiv Computer Science, Computer Vision and Pattern Recognition, Jun. 7, 2017, 14 pages.

Que et al., "VoxelContext-Net: An Octree based Framework for Point Cloud Compression", Cornell University Library, Computer Science, Computer Vision and Pattern Recognition, Document: arXiv:2105.02158v1, May 5, 2021, 10 pages.

Huang, et al., "OctSqueeze: Octree-Structured Entropy Model for LiDAR Compression", Proceedings of the IEEE/CVF Conference on Computer Vision and Pattern Recognition, 2020, pp. 1313-1323.

Kaya et al., "Neural Network Modeling of Probabilities for Coding the Octree Representation of Point Clouds", arxiv.org, Cornell University Library, 201 Olin Library Cornell University Ithaca, NY 14853, Jun. 11, 2021, 6 pages.

Lasserre et al., "Using neighbouring nodes for the compression of octrees representing thegeometry of point clouds", In Proceedings of the 10th ACM Multimedia Systems Conference (pp. 145-153), Jun. 30, 2019.

* cited by examiner

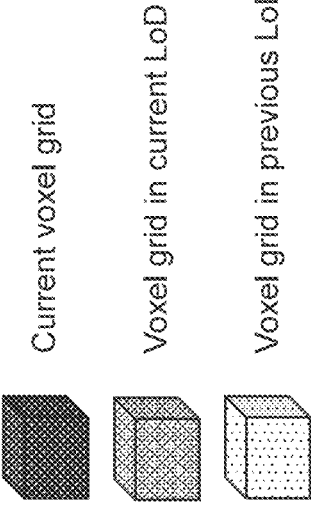
Current voxel grid
Voxel grid in current LoD
Voxel grid in previous LoD
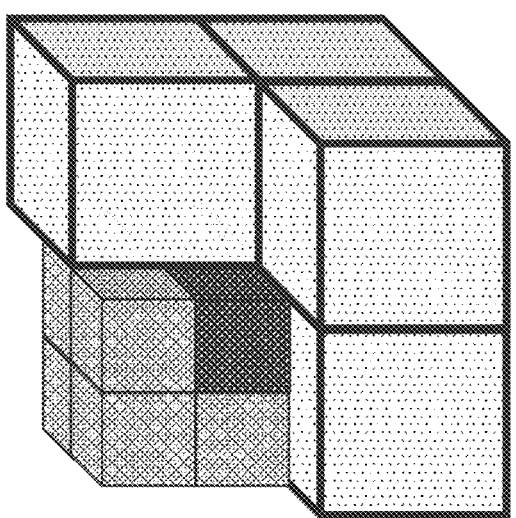
FIG. 5

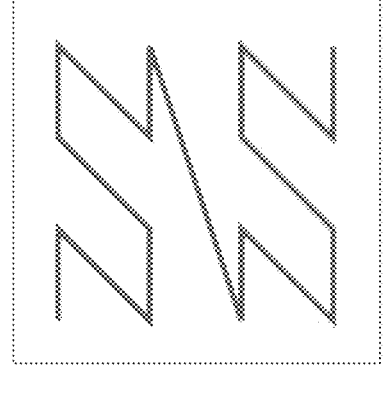
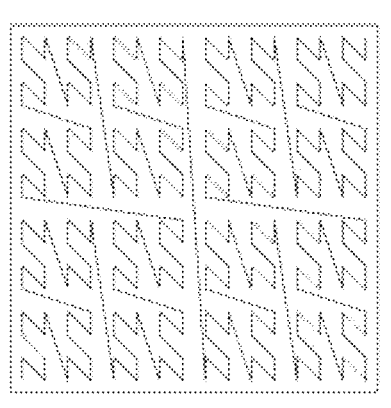
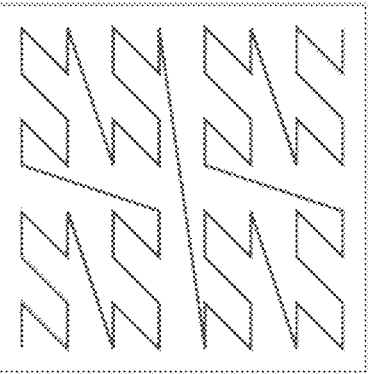
FIG. 6

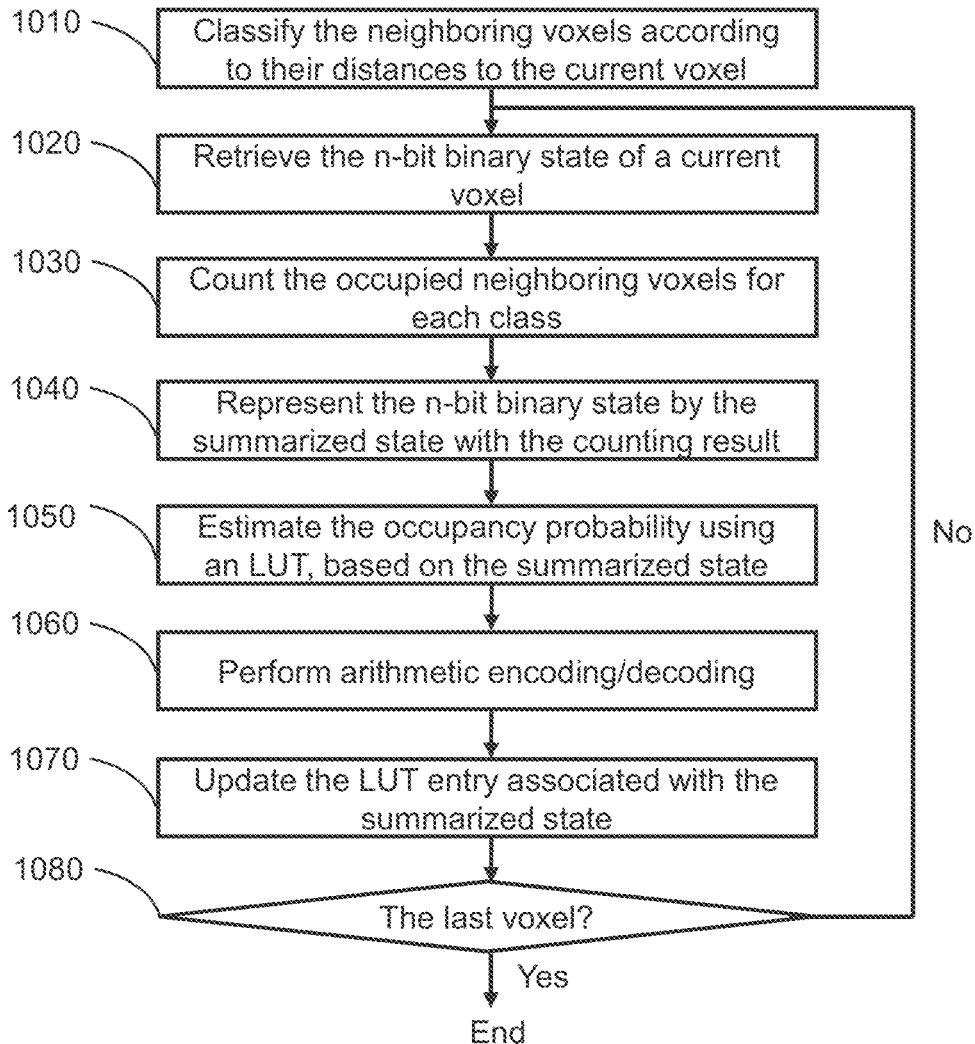

1010 — Classify the neighboring voxels according to their distances to the current voxel 1020 — Retrieve the n-bit binary state of a current voxel 1030 — Count the occupied neighboring voxels for each class 1040 — Represent the n-bit binary state by the summarized state with the counting result 1050 — Estimate the occupancy probability using an LUT, based on the summarized state 1060 — Perform arithmetic encoding/decoding 1070 — Update the LUT entry associated with the summarized state 1080 — The last voxel?

No

Yes

End

FIG. 10

$p_{pri} = 0.5 \times 0.9^3 = 0.3645$ $p_{pri} = 0.5 \times 0.9^2 = 0.405$ $p_{pri} = 0.5 \times 0.9 = 0.45$ $p_{pri} = 0.5$

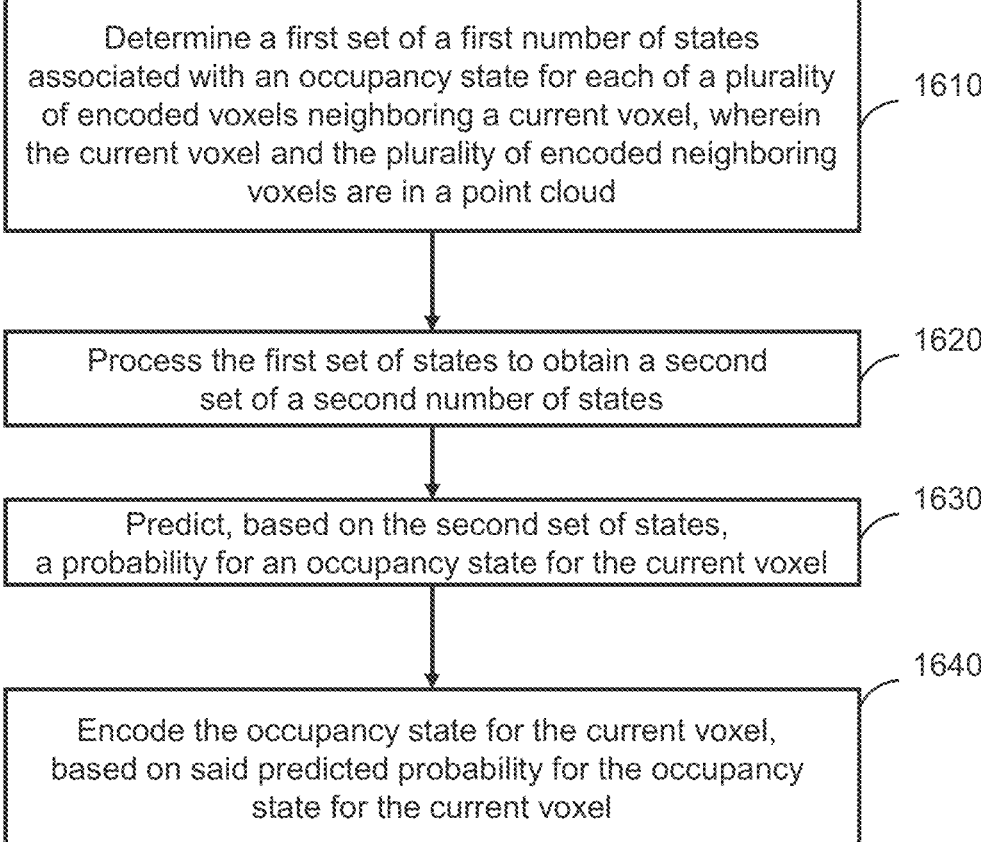

Determine a first set of a first number of states associated with an occupancy state for each of a plurality of encoded voxels neighboring a current voxel, wherein the current voxel and the plurality of encoded neighboring voxels are in a point cloud — 1610

Process the first set of states to obtain a second set of a second number of states — 1620

Predict, based on the second set of states, a probability for an occupancy state for the current voxel — 1630

Encode the occupancy state for the current voxel, based on said predicted probability for the occupancy state for the current voxel — 1640

FIG. 16

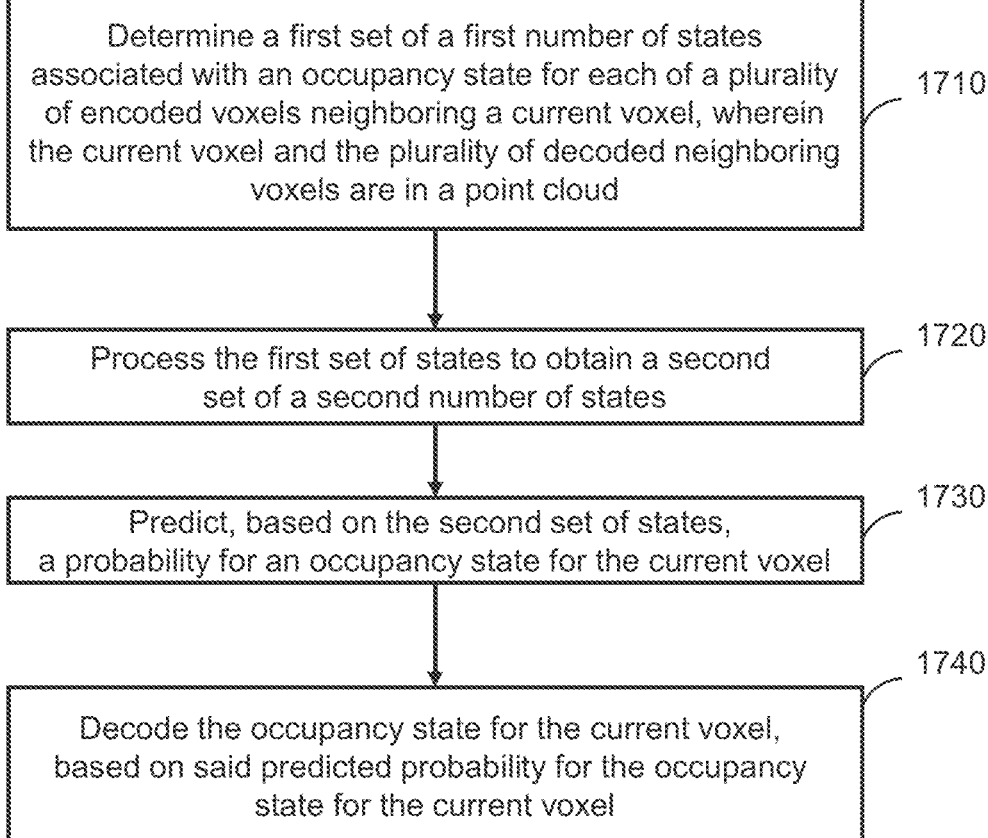

Determine a first set of a first number of states associated with an occupancy state for each of a plurality of encoded voxels neighboring a current voxel, wherein the current voxel and the plurality of decoded neighboring voxels are in a point cloud — 1710

Process the first set of states to obtain a second set of a second number of states — 1720

Predict, based on the second set of states, a probability for an occupancy state for the current voxel — 1730

Decode the occupancy state for the current voxel, based on said predicted probability for the occupancy state for the current voxel — 1740

FIG. 17

STATE SUMMARIZATION FOR BINARY VOXEL GRID CODING

CROSS REFERENCE TO RELATED APPLICATIONS

This application is a U.S. National Stage Application under 35 U.S.C. 371 of International Patent Application No. PCT/US2022/046957, filed Oct. 18, 2022, which is incorporated herein by reference in its entirety.

This application claims the benefit of U.S. patent application Ser. No. 63/275,511 filed Nov. 4, 2021 and 63/332,375 filed Apr. 19, 2022, each of which is incorporated herein by reference in its entirety.

TECHNICAL FIELD

The present embodiments generally relate to a method and an apparatus for point cloud compression and processing.

BACKGROUND

The Point Cloud (PC) data format is a universal data format across several business domains, e.g., from autonomous driving, robotics, augmented reality/virtual reality (AR/VR), civil engineering, computer graphics, to the animation/movie industry. 3D LiDAR (Light Detection and Ranging) sensors have been deployed in self-driving cars, and affordable LiDAR sensors are released from Velodyne Velabit, Apple iPad Pro 2020 and Intel RealSense LiDAR camera L515. With advances in sensing technologies, 3D point cloud data becomes more practical than ever and is expected to be an ultimate enabler in the applications discussed herein.

SUMMARY

According to an embodiment, an apparatus for encoding point cloud data is provided, comprising: at least one processor configured to determine a first set of a first number of states associated with an occupancy state for each of a plurality of encoded voxels neighboring a current voxel, wherein the current voxel and the plurality of neighboring encoded voxels are in a point cloud represented by the point cloud data; process the first set of states to obtain a second set of a second number of states; predict, based on the second set of states, a probability for an occupancy state for the current voxel; and encode the occupancy state for the current voxel, based on said predicted probability for the occupancy state for the current voxel.

According to another embodiment, a method for encoding point cloud data is provided, comprising: determining a first set of a first number of states associated with an occupancy state for each of a plurality of encoded voxels neighboring a current voxel, wherein the current voxel and the plurality of encoded neighboring voxels are in a point cloud represented by point cloud data; processing the first set of states to obtain a second set of a second number of states; predicting, based on the second set of states, a probability for an occupancy state for the current voxel; and encoding the occupancy state for the current voxel, based on said predicted probability for the occupancy state for the current voxel.

According to another embodiment, an apparatus for decoding point cloud data is provided, comprising: at least one processor configured to determine a first set of a first number of states associated with an occupancy state for each of a plurality of decoded voxels neighboring a current voxel, wherein the current voxel and the plurality of neighboring decoded voxels are in a point cloud represented by the point cloud data; process the first set of states to obtain a second set of a second number of states; predict, based on the second set of states, a probability for an occupancy state for the current voxel; and decode the occupancy state for the current voxel, based on said predicted probability for the occupancy state for the current voxel.

According to another embodiment, a method for decoding point cloud data is provided, comprising: determining a first set of a first number of states associated with an occupancy state for each of a plurality of decoded voxels neighboring a current voxel, wherein the current voxel and the plurality of decoded neighboring voxels are in a point cloud represented by the point cloud data; processing the first set of states to obtain a second set of a second number of states; predicting, based on the second set of states, a probability for an occupancy state for the current voxel; and decoding the occupancy state for the current voxel, based on said predicted probability for the occupancy state for the current voxel.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding point cloud data according to the methods described above.

One or more embodiments also provide a computer readable storage medium having stored thereon video data generated according to the methods described above. One or more embodiments also provide a method and apparatus for transmitting or receiving the video data generated according to the methods described above.

BRIEF DESCRIPTION OF THE DRAWINGS

FIG. 5 illustrates an example of context from current LoD and previous LoD.

FIG. 6 illustrates Morton order.

FIG. 10 illustrates a flowchart of density-based state summarization, according to an embodiment.

DETAILED DESCRIPTION

Figure 1:
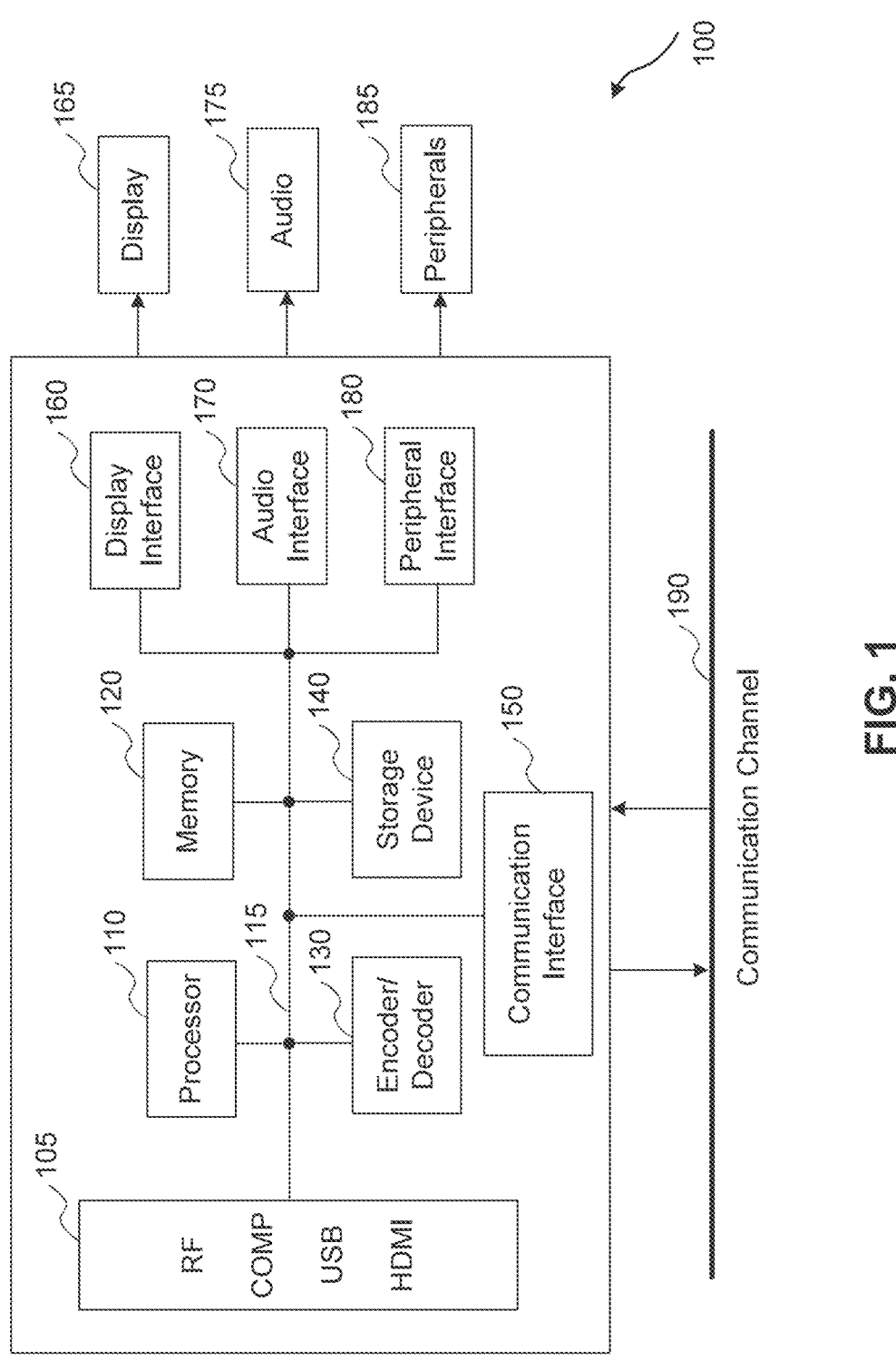
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, JPEG Pleno, MPEG-I, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing. Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

It is contemplated that point cloud data may consume a large portion of network traffic, e.g., among connected cars over 5G network, and immersive communications (VR/AR). Efficient representation formats are necessary for point cloud understanding and communication. In particular, raw point cloud data need to be properly organized and processed for the purposes of world modeling and sensing. Compression on raw point clouds is essential when storage and transmission of the data are required in the related scenarios.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different times. Dynamic point clouds may require the processing and compression to be in real-time or with low delay.

The automotive industry and autonomous car are domains in which point clouds may be used. Autonomous cars should be able to "probe" their environment to make good driving decisions based on the reality of their immediate surroundings. Typical sensors like LiDARs produce (dynamic) point clouds that are used by the perception engine. These point clouds are not intended to be viewed by human eyes and they are typically sparse, not necessarily colored, and dynamic with a high frequency of capture. They may have other attributes like the reflectance ratio provided by the LiDAR as this attribute is indicative of the material of the sensed object and may help in making a decision.

Virtual Reality (VR) and immersive worlds are foreseen by many as the future of 2D flat video. For VR and immersive worlds, a viewer is immersed in an environment all around the viewer, as opposed to standard TV where the viewer can only look at the virtual world in front of the viewer. There are several gradations in the immersivity depending on the freedom of the viewer in the environment. Point cloud is a good format candidate to distribute VR worlds. The point cloud for use in VR may be static or dynamic and are typically of average size, for example, no more than millions of points at a time.

Point clouds may also be used for various purposes such as culture heritage/buildings in which objects like statues or buildings are scanned in 3D in order to share the spatial configuration of the object without sending or visiting the object. Also, point clouds may also be used to ensure preservation of the knowledge of the object in case the object may be destroyed, for instance, a temple by an earthquake. Such point clouds are typically static, colored, and huge.

Another use case is in topography and cartography in which using 3D representations, maps are not limited to the plane and may include the relief. Google Maps is a good example of 3D maps but uses meshes instead of point clouds. Nevertheless, point clouds may be a suitable data format for 3D maps and such point clouds are typically static, colored, and huge.

World modeling and sensing via point clouds could be a useful technology to allow machines to gain knowledge about the 3D world around them for the applications discussed herein.

3D point cloud data are essentially discrete samples on the surfaces of objects or scenes. To fully represent the real world with point samples, in practice it requires a huge number of points. For instance, a typical VR immersive scene contains millions of points, while point clouds typically contain hundreds of millions of points. Therefore, the processing of such large-scale point clouds is computation-ally expensive, especially for consumer devices, e.g., smart-phone, tablet, and automotive navigation system, that have limited computational power.

In order to perform processing or inference on a point cloud, efficient storage methodologies are needed. To store and process an input point cloud with affordable computa-tional cost, one solution is to down-sample the point cloud first, where the down-sampled point cloud summarizes the geometry of the input point cloud while having much fewer points. The down-sampled point cloud is then fed to the subsequent machine task for further consumption. However, further reduction in storage space can be achieved by converting the raw point cloud data (original or down-sampled) into a bitstream through entropy coding techniques for lossless compression. Better entropy models result in a smaller bitstream and hence more efficient compression. Additionally, the entropy models can also be paired with downstream tasks which allow the entropy encoder to main-tain the task-specific information while compressing.

In addition to lossless coding, many scenarios seek lossy coding for significantly improved compression ratio while maintaining the induced distortion under certain quality levels.

Point Cloud Compression Via Octree Coding

Point clouds can be represented via an octree decompo-sition tree. A root node covers a full space in a bounding box. The space is equally split in every direction, i.e., x-, y-, and z-directions, leading to eight (8) voxels. For each voxel, if there is at least one point, the voxel is marked to be occupied, represented by '1'; otherwise, it is marked to be empty, represented by '0'. The voxel splitting then continues until a pre-specified condition is met.

Octant-Based Octree Coding

A popular approach to encode an octree is by encoding each occupied voxel with an 8-bit value which indicates the occupancy of its individual octant. In this way, we first encode the root voxel node by an 8-bit value. Then for each occupied voxel in the next level, we encode its 8-bit occu-pancy symbol, then move to the next level. We call this type of octree coding algorithm encoding the 8-bit occupancy symbols the octant-based method.

Binary Voxel-Based Octree Coding

An alternative viewpoint to encode an octree is by directly encoding the binary occupancy bits, where an occupancy bit indicates the occupancy state of the corresponding voxel (whether the corresponding voxel is occupied or not). At each level of detail (LoD), we encode a sequence of occu-pancy bits representing the voxels at the current LoD, then we move onto the next LoD. We call this type of approach binary voxel-based method. Our proposed methods in this disclosure are based on this type of approach.

By comparing the two types of coding methods, we see that in the octant-based method, the coding of a current voxel is in fact coding the occupancy symbols of its child voxels. Differently, in the binary voxel-based method, the coding of a current voxel is indeed coding the binary occupancy bit of its own. In the following, we review these two types of approaches in detail.

Octant-Based Octree Coding

Learning-Based Octree Coding for Point Clouds

Deep entropy models refer to a category of learning-based approaches that attempt to formulate a context model using a neural network module to predict the probability distribu-tion of the 8-bit occupancy symbols.

One deep entropy model is known as OctSqueeze. It utilizes ancestor nodes including a parent node, a grandparent node, etc., in a hierarchical manner. Three MLP-based modules are being used to estimate the probability distribu-tion of the occupancy symbol of a current octree node. Another deep entropy model is known as VoxelContextNet. Different from OctSqueeze that uses ancestor nodes, Voxel-ContextNet employs an approach using spatial neighbor voxels to first analyze the local surface shape then predict the probability distribution.

In previous work, we proposed a self-supervised com-pression consists of an adaptive entropy coder which oper-ates on a tree-structured conditional entropy model. The information from the local neighborhood as well as the global topology is utilized from the octree structure. In addition, we also proposed a two-branch hybrid approach that digests a given point cloud and estimates the probability distribution, where one branch is based on 3D convolutions similarly done in VoxelContextNet and the other branch is using point-based operators such as PointNet++.

Non-Learning-Based Octree Coding for Point Clouds

The most representative non-learning-based octant coding approach is MPEG G-PCC. For a current node with its occupancy symbol to be encoded, it endeavors to use the occupancy patterns of its neighbors, such as the 26 face/edge/vertex-adjacent neighbors, the child neighbors of three already-coded face-adjacent neighbor, etc., to serve as the context of the coding of the current occupancy. It involves highly complex handcrafted configurations and context merging mechanisms based on principles such as rotation invariance, plane detection, angular plane detection, etc. In this way, the most relevant probability model is obtained for arithmetic coding. In G-PCC, more flexible tree structures, such as quadtree and binary tree (QTBT), can also be used in addition to boost the compression performance.

Binary Voxel-Based Octree Coding

Instead of coding the 8-bit occupancy symbols for the octree nodes, an alternative view to encode an octree is directly viewing each point (at a certain bit depth) as a voxel grid then encode the occupancy of that voxel grid with a binary symbol.

In a related work called NNOC, the occupancy bits of the neighboring voxels in the same LoD are used as context, to predict the occupancy probability of the current voxel (the probability that the current voxel is occupied). Then the probability is predicted via a neural network module, fol-lowed by an adaptive arithmetic coder to encode the occu-pancy bit. Applying a neural network may involve higher computational cost and impose special requirements on hardware, such as graphical processing units (GPUs).

In one embodiment, the present application focuses on using (non-learning-based) deterministic modules as context models for predicting the probabilities, which can be more generally applied on different platforms. In particular, we provide methods for context modeling in the binary voxel-based octree coding scheme. We first provide the system overview on binary voxel-based octree coding, then elabo-rate our proposed context modeling method.

System Overview—Binary Voxel-Based Octree Coding

Hierarchical Coding Structure

Figure 2:
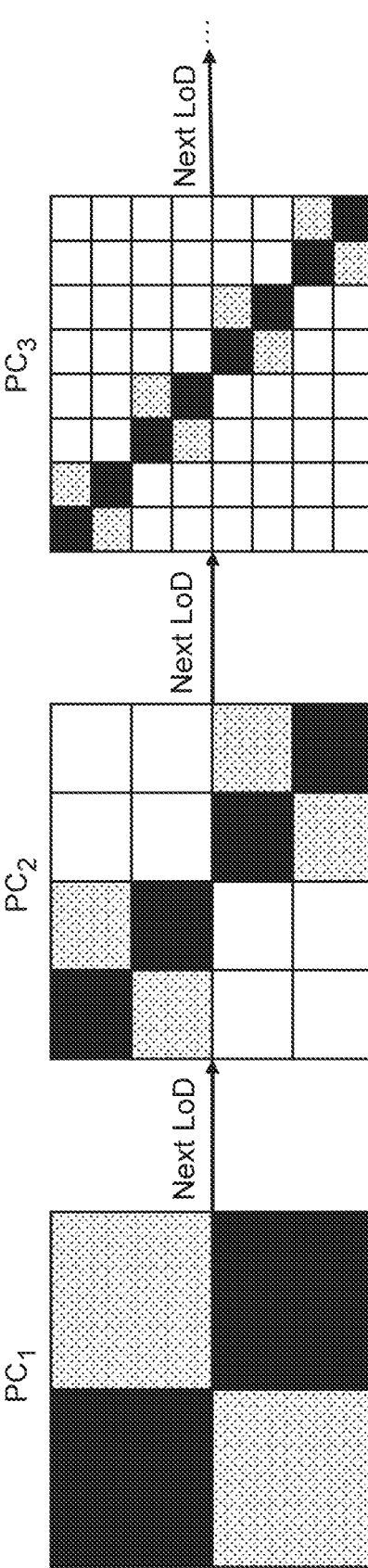
FIG. 2 illustrates an example of LoD construction of a point cloud.

We intend to compress an octree hierarchically, by directly encoding the binary occupancies of the voxels. Given an input point cloud with a bit depth of n, we encode and decode it in a hierarchical manner, as illustrated in FIG. 2. In FIG. 2, black indicates a voxel is occupied (a value "1" is placed in that voxel), and gray and white indicates a voxel is empty (a value "0" is placed in that voxel).

On the encoder side, we first construct its coarsest voxel representation $PC_1$, and $PC_1$ is firstly encoded and sent as a first bitstream $BS_1$. Then the next level of detail (LoD), $PC_2$, is constructed. By comparing $PC_2$ and $PC_1$, we know that to encode $PC_2$, only its black and gray voxels need to be encoded because the white voxels are guaranteed to be empty by looking at $PC_1$. Hence, the black and gray voxels of $PC_2$ are encoded and sent as a second bitstream $BS_2$. Next, we construct an even finer LoD, $PC_3$. Again, by comparing $PC_3$ and $PC_2$, we encode only the black and gray voxels to represent $PC_3$, leading to a third bitstream $BS_3$. This procedure repeats until the finest bit depth of the point cloud is reached. Note that all or some of the bitstreams $BS_1$, $BS_2$, $BS_3$ . . . can be multiplexed together.

Similarly, on the decoder side, we first reconstruct the coarsest LoD of the point cloud, $PC_1$, by decoding the first bitstream $BS_1$. By referring to the already decoded $PC_1$, we know that only the black and gray voxels in $PC_2$ would be included in the second bitstream $BS_2$. Hence, we decode $BS_2$ and put the decoded bits to the black and gray voxels of $PC_2$ to reconstruct it. Similarly, the third bitstream $BS_3$ is also decoded, and the decoded bits are assigned to the black and gray voxels of $PC_3$ for reconstruction. This procedure repeats until the finest bit depth of the point cloud is reached.

Context-Based Voxel Grid Coding

We encode the occupancy bits of the voxels within each LoD. To do so, a context model is adopted to predict the occupancy probability of a current voxel, followed by an adaptive arithmetic coder for encoding/decoding.

Figure 3:
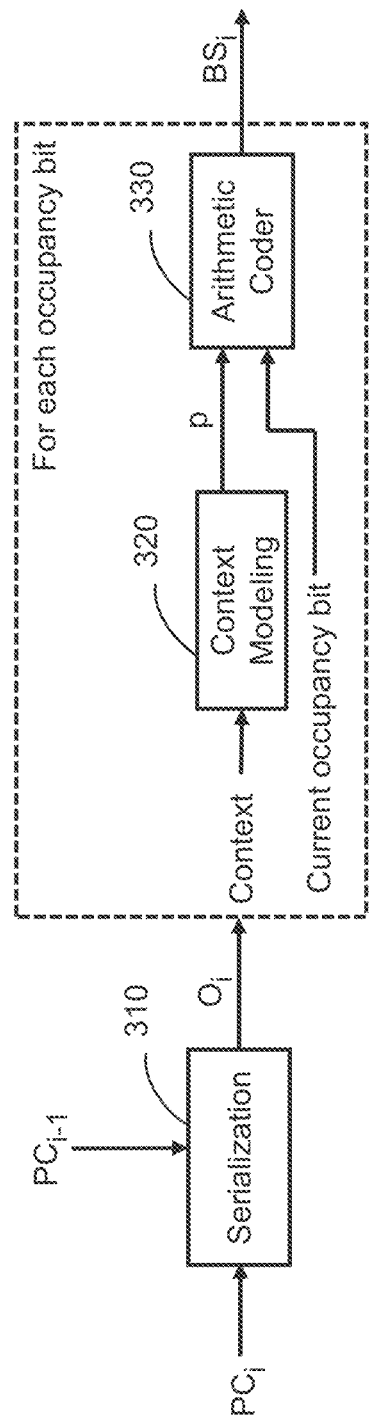
FIG. 3 shows an encoder diagram to encode the i-th LoD of the point cloud, $PC_i$.

FIG. 3 shows an encoder diagram to encode the i-th LoD of the point cloud, $PC_i$. Firstly, by comparing the (already encoded) $PC_{i-1}$ and $PC_i$, a serialization module (310) traverses the voxels need to be encoded sequentially, and outputs a series of occupancy bits, $O_i$, for example, corresponding to the black and gray voxels of an LoD in FIG. 2. With $O_i$, the point cloud at the current LoD, $PC_i$, can be fully represented. Next, each bit/voxel in $O_i$ is processed by a context modeling module (320), followed by an adaptive arithmetic encoder module (330) for encoding.

For a current voxel, the context modeling module (320) first estimates its probability being occupied (denoted by p), based on the context of the neighboring voxels that have already been encoded. Particularly, the context can be n binary occupancy bits of the neighboring voxels in the current LoD and/or the previous LoDs, as shown in FIG. 5. Then arithmetic coder (330) encodes the current occupancy bit, based on the estimated probability p. By repeating this procedure for each bit in $O_i$, the i-th bitstream $BS_i$ is generated.

Figure 4:
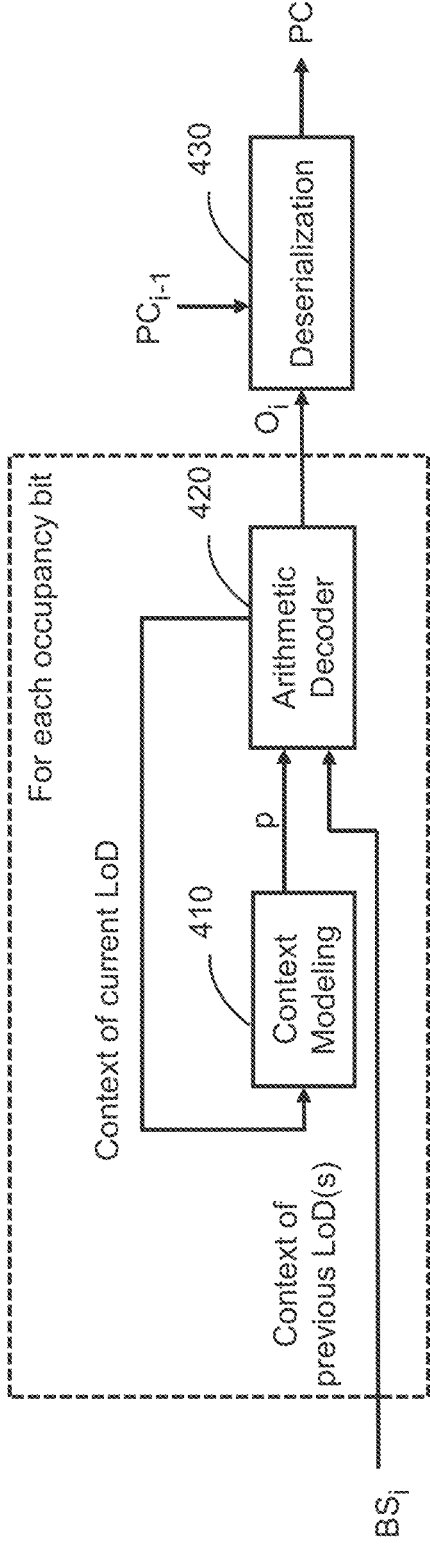
FIG. 4 shows a decoder diagram to decode the i-th LoD of the point cloud, $PC_i$.

The decoder applies a similar rationale, but operates in an opposite direction, as shown in FIG. 4. Particularly, the adaptive arithmetic decoder module (420) decodes each occupancy bits from the received bitstream $BS_i$, to obtain $O_i$. To decode an occupancy bit, the arithmetic decoder (420) takes as input not only $BS_i$ but also an occupancy probability p estimated by context modeling (410). Similar to the case of encoder, the context modeling module (410) also takes as input the context of the already decoded voxels (from current LoD and/or previous LoD(s)) and output the probability p. Next, the occupancy bits $O_i$ is assigned to the voxel grids at the current LoD by a deserialization module (430), which performs this assignment by checking the already decoded LoD $PC_{i-1}$. In the end, the deserialization module outputs the decoded point cloud at the i-th LoD, $PC_i$.

An Example on Context Modeling

Figure 7:
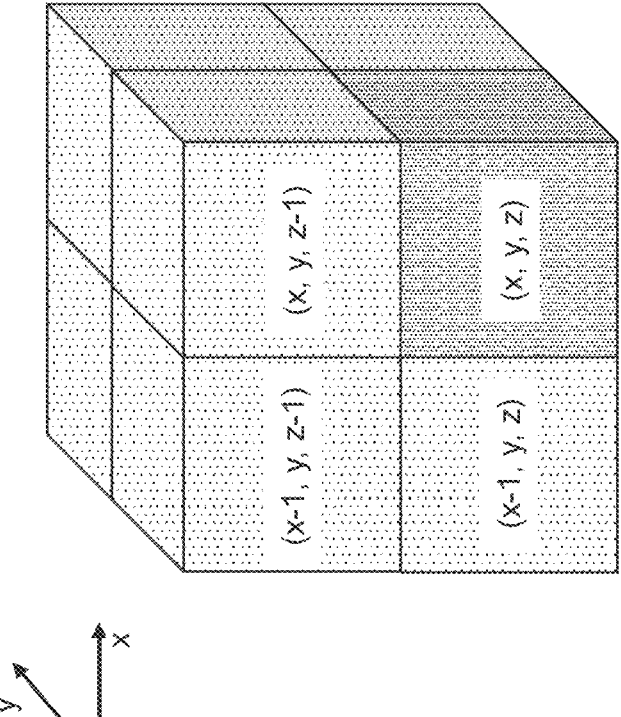
FIG. 7 illustrates context from neighboring voxel grids.

Suppose the serialization module sorts the voxels to be encoded according to the Morton order (or Z-order), as shown in FIG. 6. By serialization with the Morton order, it is guaranteed that when encoding/decoding a voxel at position (x, y, z), its $2^3-1=7$ immediate neighbors as shown in FIG. 7, namely, (x−1, y−1, z−1), (x−1, y−1, z), (x, y−1, z−1), (x−1, y, z−1), (x−1, y, z), (x, y−1, z), and (x, y, z−1), are already encoded/decoded. Hence, the 7-bit occupancy bits of these neighboring voxel grids can be collected as the context information for the context modeling module.

Since there are $2^7=128$ combinations of the occupancy bits, we construct a look-up table (LUT) with 128 entries for context modeling. Each entry in the LUT provides the occupancy probability p and is indexed by a particular occupancy combination. At the very beginning, the occupancy probability p's are, for example, all initialized as 0.5. Then after encoding/decoding one occupancy bit, the probability p of the associated entry would be updated by the following moving average mechanism:

$$p_{new} = \begin{cases} fp + (1-f), & \text{if occupied} \\ fp, & \text{otherwise} \end{cases} \qquad (1)$$

where f is a constant in [0,1].

In this example, only 7 neighboring voxels are counted for the context information, and the LUT has $2^7=128$ entries. However, in a more advanced setting where more voxels are included, the size of the LUT scales up very quickly, i.e., $2^n$ entries for n voxels. The memory cost would eventually make the algorithm unaffordable. On the other hand, more voxels being included implies that it is more difficult to capture the intrinsic regularity of the neighborhood. Hence, more efficient and effective context modeling methods are necessary, which is the problem we want to address herein. We note that in this example, Morton order is considered to guarantee that 7 immediate neighbors of the current LoD are available. However, it does not prevent us from using other scanning orders. For example, a scanning order the same as that of the related work NNOC can be adopted, which is a raster scan order along the z direction.

Our Proposal—Context Modeling Via State Summarization

The context modeling problem can be stated as: given the binary occupancy bits from a set of n (encoded/decoded) neighboring voxels, how to estimate the occupancy probability of the current voxel?

Figure 8:
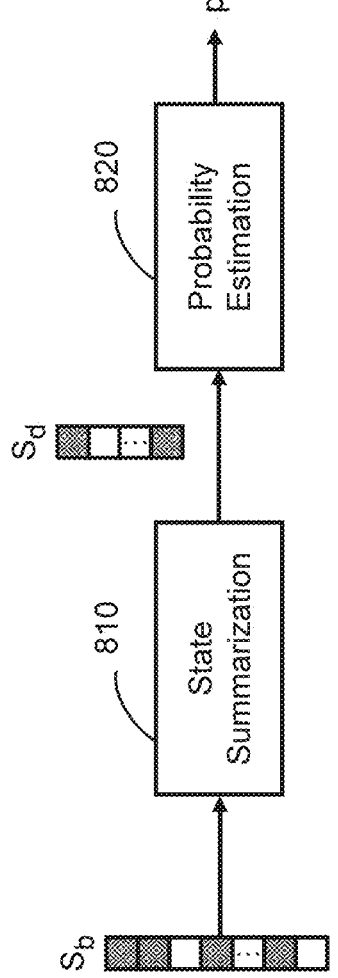
FIG. 8 illustrates context modeling with state summarization, according to an embodiment.

Note that for n neighboring voxels, there are $2^n$ possible configurations/states. In one embodiment, we propose a state summarization module which intends to reduce the number of states, as illustrated in FIG. 8.

Given an n-bit binary states $S_b$, a state summarization module (810) first converts $S_b$ to a representation in a new state space. Hereafter, the new state space is referred to as the summarized state space, and the converted state is denoted by $S_d$. We note that the total number of possible summarized state (denoted by m) should be much less than $2^n$, i.e., $m \ll 2^n$. After that, a probability estimation module (820) is appended, which outputs the occupancy probability p.

Figure 9:
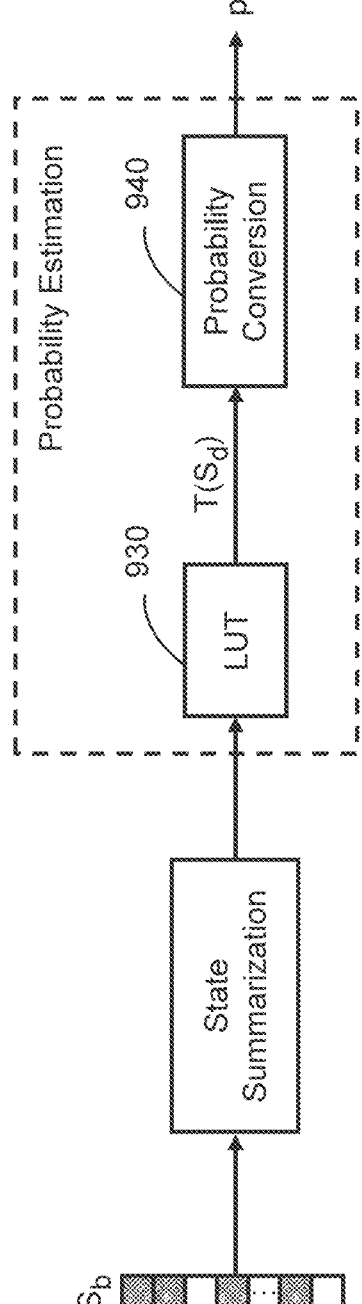
FIG. 9 illustrates context modeling with state summarization and LUT, according to an embodiment.

In one embodiment, the probability estimation consists of a LUT (930), followed by a probability conversion module (940), as shown in FIG. 9. The LUT includes m entries to keep track of the statistics of each summarized state during encoding/decoding. By accessing the LUT entry associated with the summarized state $S_d$, the statistics related to $S_d$, denoted as $T(S_d)$, is retrieved and fed to the probability conversion module (940). It then converts the statistics $T(S_d)$ to the occupancy probability p. Similar to the previous example, after encoding/decoding one occupancy bit, the statistics $T(S_d)$ in the LUT need to be updated accordingly.

More embodiments on the design of state summarization and probability estimation are provided below.

Density-Based State Summarization

Following the basic design of FIG. 9, in one embodiment, the state summarization module operates by considering the density of the occupied voxels ("1"s) in the neighboring voxels, as illustrated in FIG. 10.

Denote the set of neighboring voxels that are selected as the context information by NE, which consists of voxels from the current and/or previous LoDs. In one embodiment, we classify (1010) the voxels in set NE by the distance between the neighboring voxel to the current voxel, for example, between the center of a neighboring voxel to the center of the current voxel, which leads to k classes of neighbors with different distances, $d_0, d_1, \ldots, d_{k-1}$. Suppose there are no voxels belonging to the $d_0$ class, $n_1$ voxels belonging to the $d_1$ class, and so on, then $n_0+n_1+\ldots+n_{k-1}=n$. Take FIG. 7 as an example, where we would end up with three classes of voxels with $d_0=1$, $d_1=\mathrm{sqrt}(2)$, $d_2=\mathrm{sqrt}(3)$, and $n_0=3$, $n_1=3$, $n_2=1$.

Then having retrieved the n-bit binary state $S_b$ of a current voxel (1020), the state summarization module counts (1030) the number of occupied neighboring voxels for each of the k classes. Denote the number of occupied neighbors with distance $d_i$ by $t_i$, then the original n-bit state $S_b$ is converted as a summarized state (1040), $S_d=(t_0, t_1, \ldots, t_{k-1})$, where $0 \leq t_i \leq n_i$. Hence, an LUT with $(n_0+1) \times (n_1+1) \times \ldots \times (n_{k-1}+1)$ can be constructed to keep track of the statistics of each of the summarized state. For the example in FIG. 7, an LUT with $4 \times 4 \times 2 = 32$ entries would be built, which is much smaller than the original LUT with 128 entries.

In one embodiment, the LUT directly tracks a probability p for each summarized state using the same moving-averaging mechanism of Eq. (1). In this case, $T(S_d)=p$, and the probability conversion module is simply an identity function.

In one embodiment, the LUT tracks two items: the total number of a certain state $S_d$ is being observed, denoted as $A(S_d)$; and the total number of times a current voxel with state $S_d$ is occupied, denoted as $O(S_d)$. In this case, the statistics $T(S_d)=(A(S_d), O(S_d))$, and $O(S_d) \leq A(S_d)$.

Next, the probability conversion module PC is applied based on the LUT statistics (1050). In one embodiment, the occupancy probability p is simply calculated as the empirical probability $p_{em}=O(S_d)/A(S_d)$. In a more advanced embodiment, the probability estimation module estimates the occupancy probability p based on a prior probability $p_{pri}$, as follows:

$$p = \left(1 - \frac{1}{A(S_d)^\alpha}\right) p_{em} + \frac{1}{A(S_d)^\alpha} p_{pri}, \qquad (2)$$

where $\alpha$ is a positive constant. In one embodiment, $p_{pri}$ is set to be 0.5. We see that when $A(S_d)$, i.e., the times a particular state being observed, becomes larger, the empirical probability $p_{em}$ becomes more trustworthy, then p would be more inclined towards $p_{em}$. Otherwise, the prior probability $p_{pri}$ would be more dominate.

After arithmetic encoding/decoding (1060), the LUT entry associated with $T(S_d)$ will be updated (1070). Particularly, $A(S_d)$ will be increased by 1; while $O(S_d)$ will be increased by 1 if the current voxel is occupied, otherwise it will stay unchanged. The process ends after the last voxel is processed (1080).

Pattern-Based State Summarization

Figure 11:
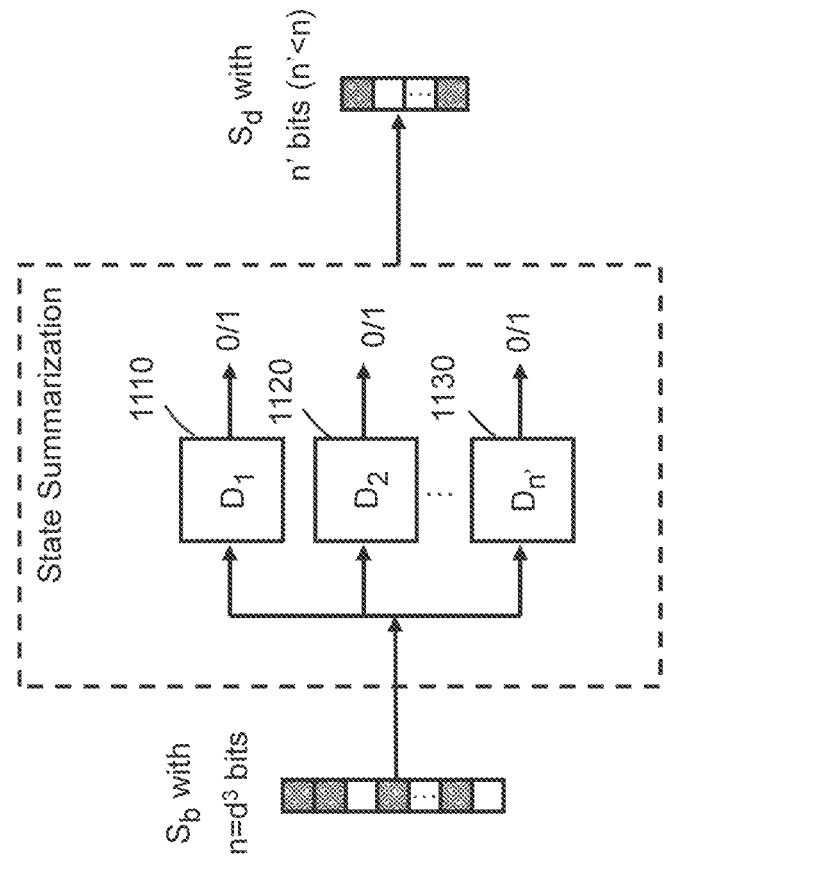
FIG. 11 illustrates pattern-based state summarization, according to an embodiment.

In one embodiment, the state summarization module operates by detecting whether a set of predefined patterns appear in the voxel neighborhood, as illustrated in FIG. 11.

In this embodiment, we use the set of $d^3$ already encoded/decoded neighboring voxels at the current LoD to form the n-bit occupancy $S_b$, where $n=d^3$. Note that the number of d can be varied across different implementations. However, once it is chosen in a particular implementation, it stays as a constant for both the encoder and the decoder. Take FIG. 7 as an example, d equals 2. Then the state summarization module detects a set of $n' < n$ predefined patterns, such as lines, planes, from the $d^3$ cube. The detection is performed by a set of detection modules (1110, 1120, 1130), $D_1$, $D_2, \ldots, D_{n'}$. In one embodiment, the detection module $D_i$ applies a predefined 3D filter onto the $d^3$ neighborhood and checks the filter response to see whether a target pattern has appeared. Each of the $D_i$ modules output a binary bit, "1" means the pattern exists while "0" means the pattern does not exist. Hence, the state summarization module output, $S_d$, is also a binary sequence similar to $S_b$. However, since $n' < n$, the summarized state space has $2^{n'}$ states which is at least two times smaller than $2^n$.

In one embodiment, a LUT is constructed to keep track of the statistics of the summarized state $S_d$, then a probability conversion module PC is applied to output p, the same as presented in FIG. 9.

In another embodiment, an occupancy probability p is output directly based on $S_b$ by the probability estimation module (FIG. 8). Specifically, we assign each of the n' patterns a predefined score, $w_1, w_2, \ldots, w_{n'}$. Then the occupancy probability can be computed as $$p = \frac{\sum_{i=1}^{n'} D_i(S_b) \cdot w_i}{\sum_{i=1}^{n'} w_i},$$

where the denominator is a normalizer to guarantee p ranges from 0 to 1.

Context Modeling for Sparse Point Clouds

In one embodiment, the state summarization module works with the probability prediction module in a way to account for the sparsity in the point cloud data. More specifically, for the last few LoDs, each occupied binary voxel will only have one occupied binary child voxel with high probability.

This phenomenon can be counted by the probability estimation module. In one embodiment, we use the design of FIG. 9, and compute the probability p with Eq. (2). In this embodiment, we adaptively modify the prior probability $p_{pri}$ when coding the last few LoDs. This prior probability $p_{pri}$ has a higher value if none of the already decoded sibling voxels from the same parent are occupied. For every additional same parent sibling voxel being occupied, the prior probability $p_{pri}$ is scaled down in value by a factor E, where $0 < \varepsilon < 1$, and $\varepsilon$ can either depend on the number of occupied sibling nodes from the same parent, or simply chosen as a constant. This way the model leans towards producing sparsely occupied voxels when encoding last few LoDs.

Figures 12A, 12B, 12C, 12D:
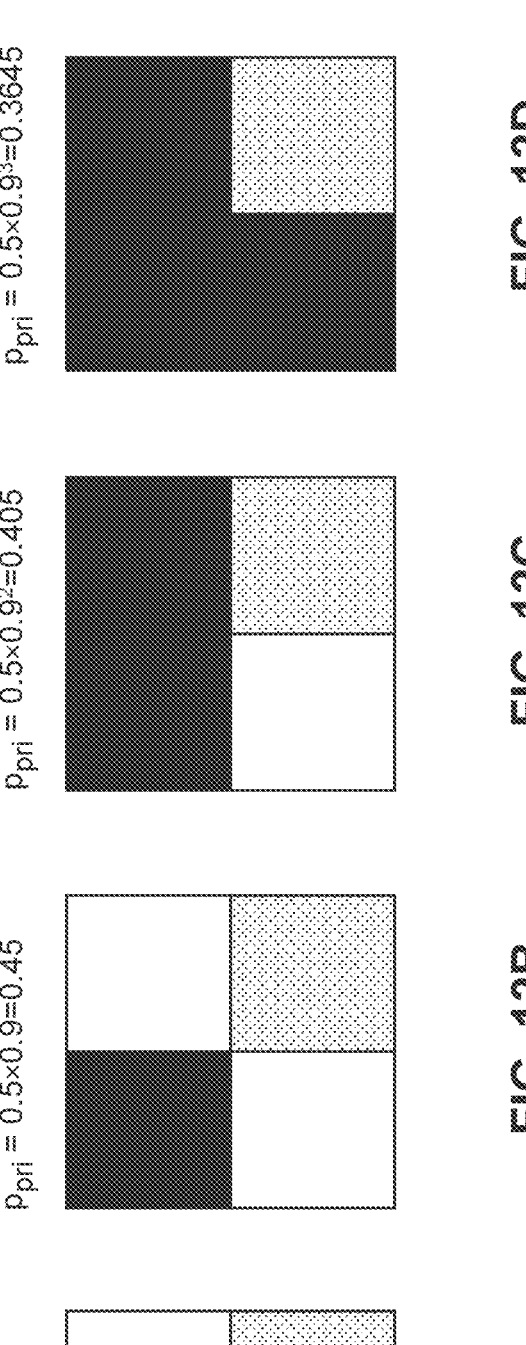
FIGS. 12A, 12B, 12C and 12D illustrate context modeling for sparse point clouds, according to an embodiment.

FIG. 12 illustrates an example for $\varepsilon=0.9$, where the gray voxel is the current voxel to be encoded/decoded, and the black and the white voxels means occupied voxels and empty voxels, respectively. As more occupied voxels are observed, the prior probability $p_{pri}$ becomes smaller. In this example, $p_{pri}=0.5$ when no sibling voxel is occupied as shown in FIG. 12A. When one, two or three sibling voxels are occupied as shown in FIGS. 12B, 12C and 12D, $p_{pri}$ becomes $0.5 \times 0.9 = 0.45$, $0.5 \times 0.9^2 = 0.405$, $0.5 \times 0.9^3 = 0.3645$, respectively.

In another embodiment, instead of just counting voxels from the same parent, voxels from different parents can also be accounted. This is because if neighboring voxels from different parents than current parent node are occupied, it reduces the probability of the current parent node being occupied. In this case, the prior probability $p_{pri}$ is scaled in value by a factor $\beta$, where $0 < \beta < 1$. The value of $\beta$ can depend on the number of occupied sibling nodes from different parents but at the same level. It can also be chosen as a constant.

Learning-Based State Summarization

In the above, we proposed hand-engineered state summarization modules. However, with these kinds of modules there may be a limit to the best-case performance and also such modules may be only beneficial to the data type for which the module was designed, with little adaptability. On the other hand, an approach to design these modules is to use learning-based neural network architectures which are universal function approximators and can adapt to any kind of data used for training.

Figure 13:
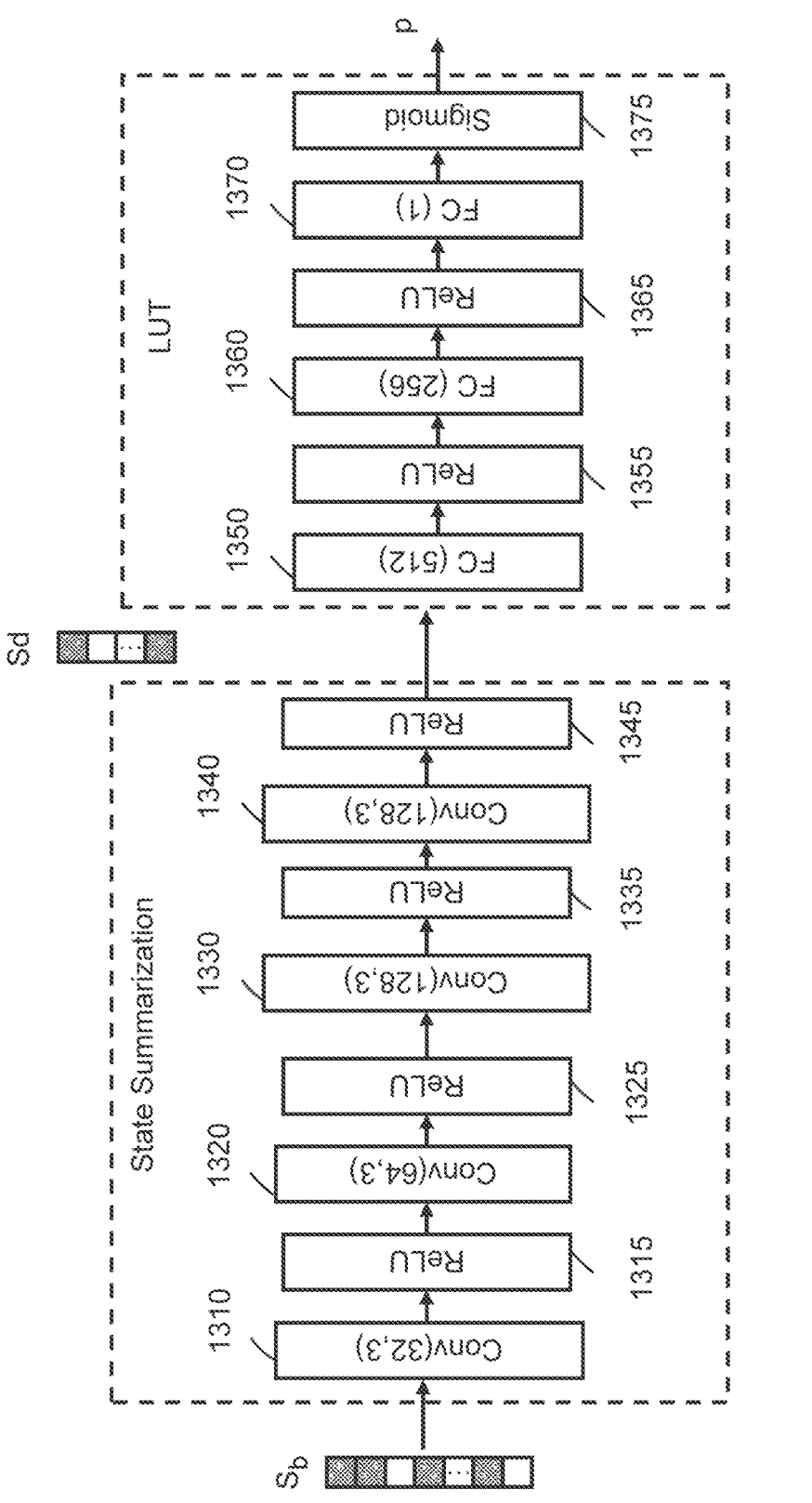
FIG. 13 illustrates learning-based state summarization based on 3D CNN and LUT, according to an embodiment.

In this regard, following the basic design as illustrated in FIG. 9, in one embodiment, the state summarization module consists of a 3D CNN (convolution neural network) architecture as shown in FIG. 13 that takes the n binary neighboring voxels as input and outputs an m-dimensional state $S_d$. This architecture consists of several 3D convolutional layers (1310, 1320, 1330, 1340), each followed by a ReLU non-linearity (1315, 1325, 1335, 1345). The m-dimensional state $S_d$ is in the latent space representation and may have much more representation capacity than any hand-crafted state summarization module. This state $S_d$ is then input to a LUT that is also a learning-based neural network architecture consisting of several fully connected layers (1350, 1360, 1370), followed by ReLU non-linearities (1355, 1365) between the FC (Fully Connected) layers, and finally a sigmoid (1375) at the end. This LUT directly outputs the occupancy probability of the current voxel. The 3D convolutions used for the state summarization module can be regular, sparse, or sparse manifold convolutions. For the training of the state summarization combined with the LUT, the binary cross entropy loss can be used along with standard neural network training tools and ample training data specific to the required application of interest.

One thing to note is that since the LUT is now a learning-based module, the size of the m-dimensional latent state Sa can be smaller, equal to or larger than the size of the n-dimensional input state $S_b$. This means that the learning-based state summarization has now the potential to extract even richer information about the scene, especially when m>n.

Figure 14:
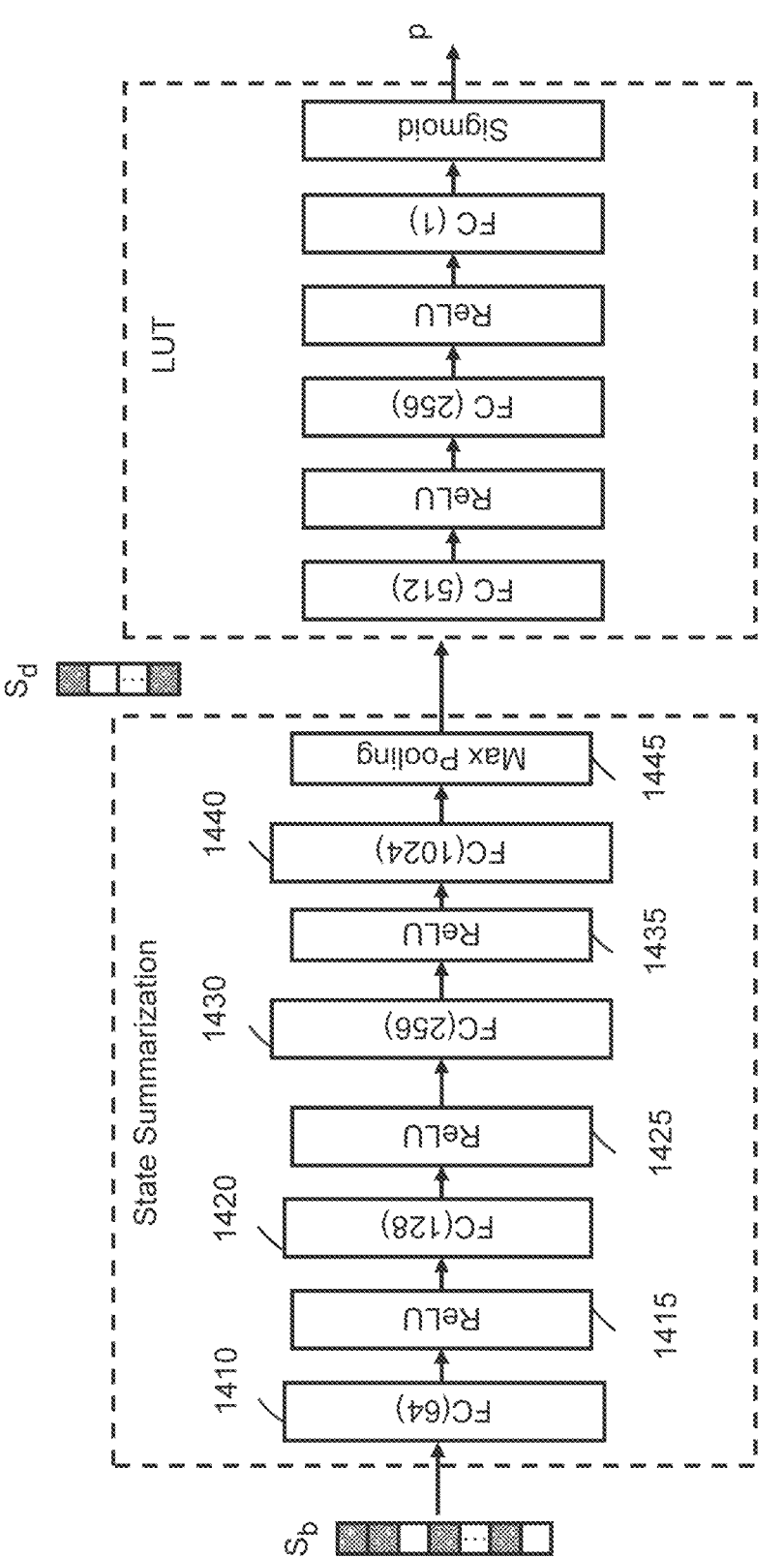
FIG. 14 illustrates learning-based state summarization based on MLP and LUT, according to an embodiment.

Since we are dealing with 3D data, in another embodiment, the state summarization module consists of a native 3D point-based MLP (multilayer perceptron) architecture, as illustrated in FIG. 14. This architecture consists of several MLP layers (1410, 1420, 1430, 1440), followed by the ReLU non-linearities (1415, 1425, 1435) between the layers, and finally a Max Pooling layer (1445). The 3D locations of the non-empty voxels in the neighborhood can be easily obtained for this point-based state summarization module. Note that instead of basic MLPs, more advanced MLP architectures can also be used, e.g., PointNet++, MRG-PointNet++. The architecture of the LUT remains the same and consists of several fully connected layers followed by a sigmoid.

Figure 15:
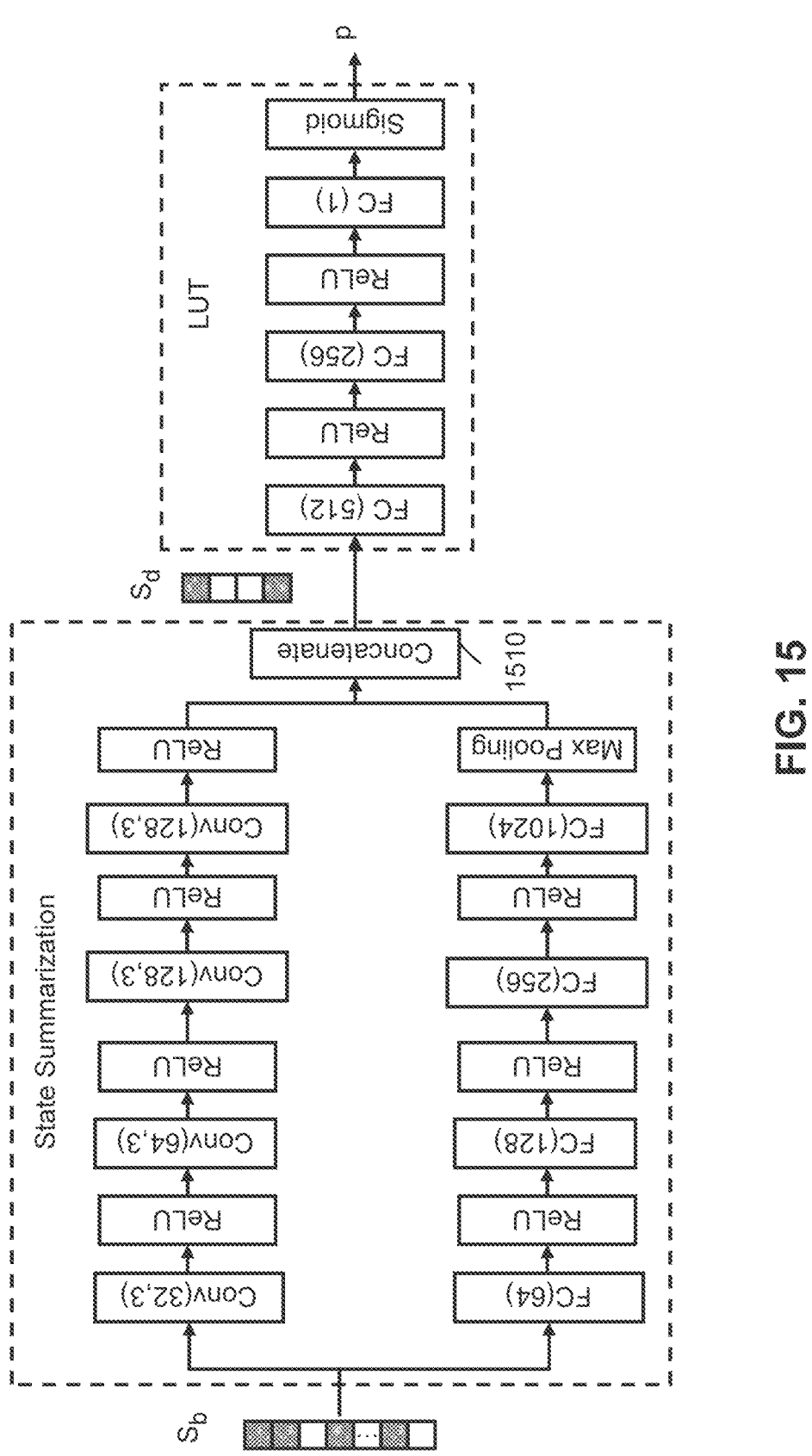
FIG. 15 illustrates learning-based state summarization based on 3D CNN+MLP and LUT, according to an embodiment.

In yet another embodiment, the state summarization module is a hybrid architecture consisting of two branches: one branch with a voxel-based convolution architecture, and second branch with a point-based MLP architecture. The outputs of both branches are then concatenated (1510) and fed into the LUT for occupancy probability prediction. An example of such architecture is shown in FIG. 15. Such an architecture excels by utilizing the best of both worlds: MLPs can extract finer details from the scene while 3D-CNNs are more suited for smoother uniform areas within the scene. LUT module remains the same architecture as before.

It should be noted here that the provided architecture in accompanying FIGS. 13-15 are only examples of the proposed methodologies. Other realizations with fewer or more 3D convolutional or fully connected layers are possible. Moreover, the sizes of the layers can also be changed to adapt to the type of application, i.e., for more complex applications with more complex data the size and the number of layers can be increased, and vice versa for simpler applications.

FIG. 16 illustrates a method for encoding point cloud data, according to an embodiment. In this embodiment, the encoder determines (1610) a first set of a first number of states associated with an occupancy state for each of a plurality of encoded neighboring voxels, wherein the current voxel and the plurality of encoded neighboring voxels are in a point cloud. The first set of states is processed (1620) to obtain a second set of a second number of states. Typically, the second number is smaller than the first number. However, the second number can be equal to or greater than the first number. Based on the second set of states, a probability for an occupancy state is predicted (1630) for the current voxel. Then the encoder encodes (1640) the occupancy state for the current voxel, based on said predicted probability for the occupancy state for the current voxel.

FIG. 17 illustrates a method for decoding point cloud data, according to an embodiment. In this embodiment, the decoder determines (1710) a first set of a first number of states associated with an occupancy state for each of a plurality of decoded neighboring voxels, wherein the current voxel and the plurality of decoded neighboring voxels are in a point cloud. The first set of states is processed (1720) to obtain a second set of a second number of states. Typically, the second number is smaller than the first number. However, the second number can be equal to or greater than the first number. Based on the second set of states, a probability for an occupancy state is predicted (1730) for the current voxel. Then the decoder decodes (1740) the occupancy state for the current voxel, based on said predicted probability for the occupancy state for the current voxel.

Various numeric values are used in the present application. The specific values are for example purposes and the aspects described are not limited to these specific values.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device.

Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "AB", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. An apparatus for encoding point cloud data, comprising:
    at least one processor configured for
    determining a first set of a first number of states associated with an occupancy state for each of a plurality of encoded voxels neighboring a current voxel, wherein the current voxel and the plurality of neighboring encoded voxels are in a point cloud represented by the point cloud data;
    determining a density of occupied voxels in the plurality of neighboring encoded voxels;
    processing the first set of states to obtain a second set of a second number of states, based on the density of occupied voxels in the plurality of neighboring encoded voxels;
    predicting, based on the second set of states, a probability for an occupancy state for the current voxel; and
    encoding the occupancy state for the current voxel, based on said predicted probability for the occupancy state for the current voxel.

2. The apparatus of claim 1, wherein processing the first set of states comprises converting the first set of states to a summarized state space having the second number of states.

3. The apparatus of claim 1, wherein determining the density of occupied voxels comprises:
    classifying the voxels neighboring the current voxel into one or more classes of neighboring voxels based on a distance from each neighboring voxel to the current voxel; and
    determining a number of occupied neighboring voxels included in each of the one or more classes of neighboring voxels.

4. The apparatus of claim 2, wherein converting the first set of states to the summarized state space comprises determining that one or more of a set of patterns exists in a voxel neighborhood comprising the plurality of neighboring voxels.

5. The apparatus of claim 1, wherein processing the first set of states comprises applying a neural network including a plurality of point-based MLP layers.

6. The apparatus of claim 1, wherein processing the first set of states comprises applying a first neural network including a plurality of convolutional layers and a second neural network including a plurality of point-based MLP layers, wherein outputs from said first and second neural networks are concatenated.

7. A method for encoding point cloud data, comprising:
    determining a first set of a first number of states associated with an occupancy state for each of a plurality of encoded voxels neighboring a current voxel, wherein the current voxel and the plurality of encoded neighboring voxels are in a point cloud represented by point cloud data;
    determining a density of occupied voxels in the plurality of neighboring encoded voxels;
    processing the first set of states to obtain a second set of a second number of states, based on the density of occupied voxels in the plurality of neighboring encoded voxels;

predicting, based on the second set of states, a probability for an occupancy state for the current voxel; and encoding the occupancy state for the current voxel, based on said predicted probability for the occupancy state for the current voxel.

8. The method of claim 7, wherein determining the density of occupied voxels comprises:

classifying the voxels neighboring the current voxel into one or more classes of neighboring voxels based on a distance from each neighboring voxel to the current voxel; and determining a number of occupied neighboring voxels included in each of the one or more classes of neighboring voxels.

9. The method of claim 7, wherein processing the first set of states comprises converting the first set of states to a summarized state space having the second number of states.

10. The method of claim 9, wherein converting the first set of states to the summarized state space comprises determining that one or more of a set of patterns exists in a voxel neighborhood comprising the plurality of neighboring voxels.

11. The method of claim 7, wherein processing the first set of states comprises applying a neural network including a plurality of point-based MLP layers.

12. The method of claim 7, wherein processing the first set of states comprises applying a first neural network including a plurality of convolutional layers and a second neural network including a plurality of point-based MLP layers, wherein outputs from said first and second neural networks are concatenated.

13. An apparatus for decoding point cloud data, comprising:

at least one processor configured for determining a first set of a first number of states associated with an occupancy state for each of a plurality of decoded voxels neighboring a current voxel, wherein the current voxel and the plurality of neighboring decoded voxels are in a point cloud represented by the point cloud data;

determining a density of occupied voxels in the plurality of neighboring encoded voxels;

processing the first set of states to obtain a second set of a second number of states, based on the density of occupied voxels in the plurality of neighboring encoded voxels;

predicting, based on the second set of states, a probability for an occupancy state for the current voxel; and decoding the occupancy state for the current voxel, based on said predicted probability for the occupancy state for the current voxel.

14. The apparatus of claim 13, wherein processing the first set of states comprises converting the first set of states to a summarized state space having the second number of states.

15. The apparatus of claim 14, wherein converting the first set of states to the summarized state space comprises determining that one or more of a set of patterns exists in a voxel neighborhood comprising the plurality of neighboring voxels.

16. The apparatus of claim 13, wherein processing the first set of states comprises applying a neural network including a plurality of point-based MLP layers.

17. A method for decoding point cloud data, comprising:

determining a first set of a first number of states associated with an occupancy state for each of a plurality of decoded voxels neighboring a current voxel, wherein the current voxel and the plurality of decoded neighboring voxels are in a point cloud represented by the point cloud data;

determining a density of occupied voxels in the plurality of neighboring encoded voxels;

processing the first set of states to obtain a second set of a second number of states, based on the density of occupied voxels in the plurality of neighboring encoded voxels;

predicting, based on the second set of states, a probability for an occupancy state for the current voxel; and decoding the occupancy state for the current voxel, based on said predicted probability for the occupancy state for the current voxel.

18. The method of claim 17, wherein processing the first set of states comprises converting the first set of states to a summarized state space having the second number of states.

19. The method of claim 18, wherein converting the first set of states to the summarized state space comprises determining that one or more of a set of patterns exists in a voxel neighborhood comprising the plurality of neighboring voxels.

20. The method of claim 17, wherein processing the first set of states comprises applying a neural network including a plurality of point-based MLP layers.

\* \* \* \* \*